US006904971B2

(12) United States Patent
Brothers et al.

(10) Patent No.: US 6,904,971 B2
(45) Date of Patent: Jun. 14, 2005

(54) CEMENT COMPOSITIONS WITH IMPROVED CORROSION RESISTANCE AND METHODS OF CEMENTING IN SUBTERRANEAN FORMATIONS

(75) Inventors: Lance E. Brothers, Chickasha, OK (US); William J. Caveny, Rush Springs, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 138 days.

(21) Appl. No.: 10/423,207

(22) Filed: Apr. 24, 2003

(65) Prior Publication Data

US 2004/0211564 A1 Oct. 28, 2004

(51) Int. Cl.$^7$ ............................................. E21B 33/138
(52) U.S. Cl. ........................................ 166/293; 106/692
(58) Field of Search ....................... 166/285, 292–295; 106/692, 696

(56) References Cited

U.S. PATENT DOCUMENTS

| | | | |
|---|---|---|---|
| 2,250,107 A | 7/1941 | Nelles .......................... 106/97 |
| 3,180,748 A | 4/1965 | Holmgren et al. .......... 106/104 |
| 3,782,985 A | 1/1974 | Gebbhardt .................... 106/97 |
| 3,901,316 A | 8/1975 | Knapp ......................... 166/250 |
| 4,111,710 A | 9/1978 | Pairaudeau et al. ........... 106/90 |
| 4,217,144 A | 8/1980 | Mathieu ...................... 106/104 |
| 4,256,503 A | 3/1981 | Tsuda et al. ................. 106/100 |
| 4,304,298 A | 12/1981 | Sutton .......................... 166/293 |
| 4,310,486 A | 1/1982 | Cornwell et al. ............ 264/309 |
| 4,340,427 A | 7/1982 | Sutton .......................... 106/87 |
| 4,367,093 A | 1/1983 | Burkhalter et al. ........... 106/87 |
| 4,397,354 A | 8/1983 | Dawson et al. .............. 166/294 |
| 4,450,010 A | 5/1984 | Burkhalter et al. ........... 106/87 |
| 4,460,052 A | 7/1984 | Gockel ......................... 175/72 |
| 4,498,995 A | 2/1985 | Gockel .................. 252/8.5 LC |
| 4,537,918 A | 8/1985 | Parcevaux et al. ........... 523/130 |
| 4,565,578 A | 1/1986 | Sutton et al. ................... 106/87 |
| 4,596,834 A | 6/1986 | Widener et al. ............... 521/83 |
| 4,635,724 A | 1/1987 | Bruckdorfer et al. ....... 166/268 |
| 4,721,160 A | 1/1988 | Parcevaux et al. ........... 166/293 |
| 4,767,460 A | 8/1988 | Parcevaux et al. ............ 106/90 |
| 4,784,223 A | 11/1988 | Worrall et al. ............... 166/287 |
| 4,916,012 A | 4/1990 | Sawanobori et al. ........ 428/367 |
| 4,927,462 A | 5/1990 | Sugama ......................... 106/99 |
| 5,032,181 A | 7/1991 | Chung .......................... 106/717 |
| 5,120,367 A | 6/1992 | Smith et al. .................. 106/823 |
| 5,147,565 A | 9/1992 | Bour et al. ................. 252/8.551 |
| 5,159,980 A | 11/1992 | Onan et al. ................... 166/294 |
| 5,185,389 A | 2/1993 | Victor ............................ 524/2 |
| 5,223,168 A * | 6/1993 | Holt ............................ 510/238 |
| 5,250,578 A | 10/1993 | Cornwell ....................... 521/83 |
| 5,258,222 A | 11/1993 | Crivelli ........................ 428/323 |
| 5,307,876 A | 5/1994 | Cowan et al. ................ 166/293 |
| 5,339,903 A | 8/1994 | Eoff et al. .................... 166/293 |
| 5,340,397 A | 8/1994 | Brothers ...................... 106/727 |
| 5,391,226 A | 2/1995 | Frankowski .................. 106/696 |
| 5,453,310 A | 9/1995 | Andersen et al. ............ 428/34.4 |
| 5,456,751 A | 10/1995 | Zandi et al. .................. 106/724 |
| 5,588,489 A | 12/1996 | Chatterji et al. ............. 166/293 |
| 5,624,489 A | 4/1997 | Fu et al. ...................... 106/692 |
| 5,696,059 A | 12/1997 | Onan et al. ................... 507/269 |
| 5,779,787 A | 7/1998 | Brothers et al. ............ 106/802 |
| 5,791,380 A | 8/1998 | Onan et al. ................... 138/149 |
| 5,820,670 A | 10/1998 | Chatterji et al. ............. 106/727 |
| 5,900,053 A | 5/1999 | Brothers et al. ............ 106/678 |
| 5,989,336 A | 11/1999 | Carpenter et al. ........... 106/811 |
| 6,063,738 A | 5/2000 | Chatterji et al. ............. 507/269 |
| 6,143,069 A | 11/2000 | Brothers et al. ............ 106/678 |
| 6,220,354 B1 | 4/2001 | Chatterji et al. ............. 166/293 |
| 6,230,804 B1 | 5/2001 | Mueller et al. .............. 166/293 |
| 6,279,652 B1 | 8/2001 | Chatterji et al. ............. 166/194 |
| 6,308,777 B2 | 10/2001 | Chatterji et al. ............. 166/293 |
| 6,332,921 B1 | 12/2001 | Brothers et al. ............ 106/692 |
| 6,457,524 B1 | 10/2002 | Roddy ........................ 166/293 |
| 6,458,198 B1 | 10/2002 | Baret et al. .................. 106/644 |
| 6,488,763 B2 | 12/2002 | Brothers et al. ............ 106/692 |
| 6,500,252 B1 | 12/2002 | Chatterji et al. ............. 106/644 |
| 6,508,306 B1 | 1/2003 | Reddy et al. ................ 166/295 |
| 6,516,883 B1 | 2/2003 | Chatterji et al. ............. 166/293 |
| 6,516,884 B1 | 2/2003 | Chatterji et al. ............. 166/294 |
| 6,569,232 B2 | 5/2003 | Castro et al. ................ 106/644 |
| 6,632,527 B1 * | 10/2003 | McDaniel et al. ........... 428/402 |
| 6,689,208 B1 | 2/2004 | Brothers ....................... 106/794 |

FOREIGN PATENT DOCUMENTS

| | | | |
|---|---|---|---|
| EP | 0 704 410 A2 | 4/1996 | ............ C04B/24/24 |
| WO | WO 00/20350 | 4/2000 | ............ C04B/28/02 |
| WO | WO 01/25163 A1 | 4/2001 | ............ C04B/28/02 |

OTHER PUBLICATIONS

Foreign communication from a related counterpart application dated Jul. 8, 2004.
Product Data Sheet entitled "Secar 60" dated Jan. 2001.
Publication entitled "Rubber–Tire Particles As Concreate Aggregate" by Neil Eldin et al. published in the Journal of Materials in Civil, Engineering, vol. 5, No. 4, pp. 479–496, dated Nov. 1993.
Publication entitled "The Properties of Rubberimzed Concretes" by I. Topcu published in the Cement and Concrete Research Journal, vol. 29, No. 2, pp. 304–310 (1995).
Publication entitled "Hot Alkali Carbonation of Sodium Metaphosphate Fly Ash/Calcium Aluminate Blend Hydrothermal Cements" by T. Sugama Published in the Cement and Concrete Research Journal, vol. 26, No. 11, pp. 1661–1672 (1996).

(Continued)

*Primary Examiner*—Zakiya Walker
(74) *Attorney, Agent, or Firm*—Craig W. Roddy; Baker Botts L.L.P.

(57) ABSTRACT

Cement compositions with improved corrosion resistance, and methods of using the compositions in a subterranean formation, are provided. The cement composition comprises a high alumina cement, vitrified shale, a soluble phosphate, and water sufficient to form a slurry. Optionally, other additives may be included, such as accelerants, retardants, dispersants, and the like.

26 Claims, No Drawings

OTHER PUBLICATIONS

Publication entitled "Mullite Microsphere–Filled Light–weight Calcium Phosphate Cement Slurries For Geothermal Wells: Setting and Properties" by T. Sugama et al. published in the Cement and Concrete Research Journal, vol. 25, No. 6, pp. 1305–1310 (1995).

Publication entitled "Carbonation of Hydrothermally Treated Phosphate–Bonded Calcium Aluminate Cement" by T. Sugama, et al. published under the auspices of the U.S. Department of Energy, Washington, D.C. under contract No. DEA–AC02–76CH00016; undated.

Publication entitled "Lightweight CO2–Resistant Cements For Geothermal Well Completions" by Lawrence E. Kukacka et al., publisher unknown and undated.

Publication entitled"Microsphere–Filled Lightweight Calcim Phosphate Cement" by Toshifumi Sugama et al. Under the ausplaces of the U.S. Department of Energy, Washington, D.C. under contract No. DE–AC02–76 CH00016; undated.

Publication entitled "Interfaces and Mechanical Behaviors of Fiber–Reinforced Calcium Phosphate Cement Compositions" by T. Sugama, et al. prepared for the Geothermal Division U.S. Department of Energy; Department of Applied Science, Jun. 1992.

Publication entitled "Calcium Phosphate Cements Prepared By Acid–Base Reaction" by Toshifumi Suagama et al. published in the Journal of the American Ceramic Society vol. 75, No. 8, pp. 2076–2087 (1992(.

Publication entitled "TXI Energy Services Introduces Pressur–Seal ™ Hi Performance Lost Circulation Material" dated Aug. 12, 1998.

Halliburton Brochure "Latex 2000 Cement Additive" dated 1998.

Halliburton brochure entitled "Pozmix® A Cement Additive" dated 1999.

Halliburton brochure entitled "Spherelite Cement Additive" dated 1999.

Halliburton brochure entitled "Thermalock™ Cement for Corrosive $CO_2$ Environments" dated 1999.

* cited by examiner

CEMENT COMPOSITIONS WITH IMPROVED CORROSION RESISTANCE AND METHODS OF CEMENTING IN SUBTERRANEAN FORMATIONS

BACKGROUND OF THE INVENTION

1. Field of the Invention

The present invention relates to subterranean well cementing operations, and more particularly, to well cement compositions having improved corrosion resistance and methods of using such compositions in subterranean formations.

2. Description of the Prior Art

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks in holes in pipe strings, and the like.

Portland cement is commonly used in subterranean cementing applications. Portland cements, however, may have limitations in certain applications, because they are prone to corrosive attacks by carbonic acid ($H_2CO_3$). Carbonic acid may be naturally present in a subterranean formation, or it may occur by the reaction of subterranean water and carbon dioxide ($CO_2$), when the latter has been injected into the formation, e.g., as in a $CO_2$-enhanced recovery operation. Carbonic acid is believed to react with the calcium hydroxide component of the Portland cement, which results in the cement becoming a soft amorphous gel. This is problematic because, inter alia, the permeability of the cement is increased. As a result, chloride and hydrogen sulfide ions, which may be present in the subterranean formation, may penetrate the cement sheath and adversely affect or react with the casing. The degradation of the cement can cause, inter alia, loss of support for the casing and undesirable interzonal communication of fluids.

The susceptibility of some cements, including Portland cements, to degradation by carbonic acid is especially problematic in some typical geothermal wells, as they involve very high temperatures, pressures and carbon dioxide concentrations. In such wells, cement failures often occur in less than five years, causing the collapse of the well casing. This in turn causes lost production and necessitates expensive casing repairs.

SUMMARY OF THE INVENTION

The present invention provides cement compositions which demonstrate improved corrosion resistance, and methods for cementing in a subterranean formation using such cement compositions.

One method of the present invention comprises providing a cement composition that comprises a high alumina cement, vitrified shale, a soluble phosphate, and water sufficient to form a slurry; placing this cement composition in a subterranean formation; and allowing the cement composition to set therein.

One embodiment of the cement compositions of the present invention comprises a high alumina cement, vitrified shale, a soluble phosphate, and water sufficient to form a slurry. Optionally, other additives suitable for cement compositions such as retardants, accelerants, fluid loss agents, and the like may be added to the cement compositions of the present invention.

The objects, features and advantages of the present invention will be readily apparent to those skilled in the art upon a reading of the description of the preferred embodiments, which follows.

DESCRIPTION OF PREFERRED EMBODIMENTS

The present invention provides cement compositions that have improved corrosion resistance and methods of using such cement compositions in subterranean formations. While the compositions and methods of the present invention are useful in a variety of subterranean applications, they are particularly useful for subterranean well completion and remedial operations, such as primary cementing, e.g., cementing casings and liners in well bores, including those in production wells, which include multi-lateral subterranean wells, and in conjunction with carbon dioxide injection wells.

The cement compositions used in the methods of the present invention generally comprise a high alumina cement, vitrified shale, a soluble phosphate, and water sufficient to form a pumpable slurry. Generally, the cement compositions of the present invention may range in density from about 6 lb/gallon to about 23 lb/gallon, preferably in the range of from about 14 lb/gallon to about 16 lb/gallon. In certain embodiments, the cement compositions can be low-density cement compositions, e.g., foamed cement compositions or cement compositions comprising microspheres.

Any cements suitable for use in subterranean applications are suitable for use in the present invention. However, to achieve some of the beneficial effects of the present invention, the hydraulic cement used is preferably a high alumina cement, e.g., a cement having an alumina concentration within the range of about 40% to about 80% of the weight of the high alumina cement. An example of a suitable cement is commercially available under the trade designation "SECAR-60," which is a high alumina cement, available from the LaFarge Corporation of Chesapeake, Va. Generally, the SECAR-60 is present in the cement composition in an amount in the range of from about 20% to about 80% by weight of the cement composition, preferably in the range of from about 30% to about 70% by weight of the cement composition.

Any type of vitrified shale may be used with the present invention. Generally speaking, the vitrified shale is present in the cement compositions of the present invention in an amount sufficient to provide a desired degree of corrosion resistance. The vitrified shale can be included in the cement composition in an amount in the range of from about 20% to about 80% by weight of the cement composition, preferably in the range of from about 30% to about 70% by weight of the cement composition. An example of a suitable vitrified shale is commercially available under the tradename of "PRESSUR-SEAL® FINE LCM" from TXI Energy Services, Inc., in Houston, Tex.

Any type of soluble phosphate may be used with the present invention, including, inter alia, vitreous sodium phosphates, sodium hexametaphosphate, sodium polyphosphate, or mixtures thereof. An example of a suitable soluble phosphate is commercially available from Calgon Corporation in Pittsburgh, Pa., under the tradename of "CALGON." In general, the soluble phosphate is present in the cement compositions of the present invention in an amount sufficient to provide a desired degree of corrosion resistance. The soluble phosphate can be included in the cement composition in an amount in the range of from about 1% to about 5% by weight of the cement composition. When included, it is believed that, inter alia, the soluble phosphate combines with the calcium aluminate of the high alumina cement to form calcium phosphate in the form of hydroxyapatite. This reaction product is resistant to corrosion.

In some embodiments, the cement compositions of the present invention also may comprise fly ash. "Fly ash" as referred to herein will be understood to mean the finely divided residue that results from the combustion of ground or powdered coal and is carried by the generated flue gases. When fly ash is used in one embodiment of the compositions of the present invention, it preferably comprises ASTM class F fly ash, which is a fine particle size ASTM class F fly ash having a Blaine fineness of about 10,585 square centimeters per gram commercially available from Halliburton Energy Services, Inc., of Houston, Tex., under the trade designation "POZMIX®."

The cement compositions of the present invention further comprise water, which can be from any source provided that it does not contain an excess of compounds that adversely affect other compounds in the cement compositions. For example, a cement composition of the present invention can comprise fresh water, salt water (e.g., water containing one or more salts dissolved therein), brine, or seawater. The water may be present in an amount sufficient to form a pumpable slurry. More particularly, the water is present in the cement compositions of the present invention in an amount in the range of from about 30% to about 50% by weight of the cement composition, more preferably in the range of from about 35% to about 45% by weight of the cement composition.

Optionally, the cement compositions of the present invention may be low-density cement compositions. For example, the cement compositions of the present invention may comprise foamed cement compositions. When foamed, the cement compositions also include an expanding additive present in an amount sufficient to foam the cement composition to a desired density. Optionally, where the cement composition is foamed, foaming agents and/or foam stabilizing agents may be included in the cement composition in order to facilitate the foaming. A particularly suitable and preferred foaming agent is ZONESEAL 2000™, commercially available from Halliburton Energy Services, Inc., of Houston, Tex., which is described in U.S. Pat. No. 6,063,738, which is incorporated herein by reference. Generally, the foaming agent and/or foam stabilizing agent is present in the cement compositions of the present invention in an amount sufficient to generate a stable foam. In some embodiments, the foaming agent and/or foam stabilizing agent is present in the cement composition in an amount in the range of from about 1% to about 2% by weight of the water in the composition.

The expanding additive utilized to foam the cement composition is preferably a gas such as air, nitrogen, or a mixture of both. Preferably, nitrogen is used. The amount of gas present in the cement composition is that amount which is sufficient to incorporate a desired amount of a gas into the cement composition so that the cement composition has a desired density. A density in the range of from about 10 to about 14 pounds per gallon is suitable. Preferably, the gas is present in the cement composition in an amount in the range of from about 5% to about 33% by volume of the cement in the composition.

Optionally, microspheres may be added, inter alia, to reduce the density of the cement composition. Any microspheres that are compatible with a subterranean cement composition, i.e., that are chemically stable over time upon incorporation into the cement, may be used. An example of a suitable microsphere is commercially available from Halliburton Energy Services, Inc., of Houston, Tex., under the tradename "SPHERELITE." Where included, the microspheres are present in the cement composition in an amount sufficient to provide a cement composition having a density in a desired range. More particularly, the microspheres may be present in the cement composition in an amount in the range of from about 10% by weight of the cement to about 80% by weight of the cement. The microspheres may be added to the cement composition by any suitable method including by dry blending with the cement before the addition of a fluid such as water, by mixing with the fluid to be added to the cement, or by mixing with the cement slurry consecutively with or after the addition of the fluid. The microspheres may be pre-suspended in water and injected into the cement mix fluid or into the cement slurry as an aqueous slurry. Preferably, the microspheres are dry blended with the cement before the addition of water.

The cement composition may optionally include inert ground rubber particles, inter alia, to provide elasticity and ductility. In one embodiment, such particles are produced from tires and are commercially available from Four D Corporation of Duncan, Okla. In one embodiment, the particles have a mean length of less than about ¼", and can pass through a filter having a mesh size of 10/20 and 20/30. Where included, the ground rubber particles are present in the cement composition in an amount sufficient to provide a desired degree of ductility to the cement composition. More particularly, the rubber particles may be present in the cement composition in an amount in the range of from about 10% to about 30% by weight of the cement.

The cement composition optionally may include carbon fibers, in order to, inter alia, increase the tensile strength of the cement composition. Where added, the carbon fibers preferably have a high tensile strength and/or a high tensile modulus. In certain preferred embodiments, to achieve certain of the advantages associated with the present invention, the tensile modulus of the fibers may exceed 180 GPa, and the tensile strength of the fibers may exceed 3000 MPa. The fibers preferably have a mean length of about 1 mm or less. In certain preferred embodiments, the mean length of the carbon fibers is from about 50 to about 500 microns. Most preferably, the fibers have a mean length in the range of about 100 to about 200 microns. Preferably, they are milled carbon fibers. An example of suitable carbon fibers includes "AGM-94" carbon fibers commercially available from Asbury Graphite Mills, Inc., of Asbury, N.J. AGM-94 fibers have a mean length of about 150 microns and a diameter of about 7.2 microns. Another example of suitable carbon fibers includes the "AGM-99" carbon fibers, also available from Asbury Graphite Mills, Inc., which have a mean length of about 150 microns and a diameter of about 7.4 microns. Generally, the carbon fibers may be present in an amount sufficient to enable the set cement to achieve a desired tensile strength. In some preferred embodiments, the carbon fibers are present in an amount in the range of from about 1% to about 15% by weight of the cement.

As will be recognized by those skilled in the art, the cement compositions of this invention also can include suitable additives, including, but not limited to, accelerants, set retarders, surfactants, fluid loss control additives, weighting materials, and dispersants. Any suitable set retarder, or a mixture of suitable set retarders, may be used in the cement compositions of the present invention. Preferred such set retarders for use in accordance with this invention are tartaric acid and citric acid. When used, a set retarder is included in the cement compositions of the present invention in an amount sufficient to retard the setting of the cement composition until a desired time after the cement composition has been placed in a subterranean formation. More particularly, the set retarder may be included in the cement compositions of the present invention in an amount in the range of from about 0.5% by weight of the cement to about 2% by weight of the cement. In certain embodiments, a mixture of set retarders is present in the cement compositions in an amount in the range of about 1% by weight of the cement to about 4% by weight of the cement. Suitable fluid loss agents include a styrene butadiene latex commercially available under the trade designation "LATEX 2000," available from Halliburton Energy Services, Inc., of Duncan, Okla., and cationic starches. An example of a suitable cationic starch is "REDI BOND 5330," available from National Starch, Inc.

An example of a cement composition of the present invention comprises SECAR 60 high alumina cement, 100% vitrified shale by weight of the cement, 1.5% sodium hexametaphosphate by weight of the cement, 4.2% citric acid by weight of the cement, and 95% water by weight of the cement.

A method of the present invention comprises providing a cement composition that comprises a high alumina cement, vitrified shale, a soluble phosphate, and water sufficient to form a pumpable slurry; placing this cement composition in a subterranean formation; and allowing the cement composition to set therein.

To facilitate a better understanding of the present invention, the following example of one of the preferred embodiments is given. In no way should such example be read to limit the scope of the invention.

EXAMPLES

A sample cement composition was prepared by mixing 332.5 grams SECAR 60 high alumina cement, 332.5 grams vitrified shale from TXI Energy Services, 35 grams sodium hexametaphosphate, and 14 grams citric acid with 318 grams water. The cement was allowed to cure for 48 hours at 120° F. A 21 gram sample of the set cement was then placed in a pressure vessel containing 1000 grams of a 1% sodium carbonate solution by weight. The vessel was sealed, and 5.5 mL of concentrated sulfuric acid was injected, for the purpose of producing carbonic acid through a reaction with the sodium carbonate solution. The vessel was then heated to 140° F. for seven days, after which the sample was removed and reweighed. The cement sample was found to have lost no weight, therefore, illustrating that the cement comprising the vitrified shale was substantially resistant to the corrosive effects of the carbonic acid. Thirty-eight days later, the sample was removed and reweighed again, and was found to have lost no weight.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a subterranean formation comprising the steps of:
   providing a cement composition comprising a high alumina cement, vitrified shale, water, and a soluble phosphate;
   placing the cement composition into the subterranean formation;
   permitting the cement composition to set therein.

2. The method of claim 1 wherein the high alumina cement has an alumina concentration in the range of from about 40% to about 80% of the weight of the high alumina cement.

3. The method of claim 1 wherein the high alumina cement is present in the cement composition in an amount in the range of from about 20% to about 80% of the weight of the cement composition.

4. The method of claim 1 wherein the vitrified shale is present in the cement composition in an amount in the range of from about 50% to about 150% by the weight of the cement composition.

5. The method of claim 1 wherein the soluble phosphate is present in the cement composition in an amount in the range of from about 1% to about 5% by the weight of the cement composition.

6. The method of claim 1 wherein the soluble phosphate comprises sodium hexametaphosphate, sodium polyphosphate, vitreous sodium phosphate, or mixtures thereof.

7. The method of claim 1 wherein the cement composition further comprises a set retardant.

8. The method of claim 7 wherein the set retardant is present in the cement composition in an amount in the range of from about 0.5% to about 2% by weight of the cement.

9. The method of claim 7 wherein the retardant is tartaric acid or citric acid.

10. The method of claim 1 wherein the cement composition further comprises a fluid loss control additive, a weighting agent, a defoamer, a surfactant, mica, fumed silica, a salt, a dispersant, a formation conditioning agent, or an accelerant.

11. The method of claim 1 wherein the water is present in the cement composition in an amount in the range of from about 30% to about 50% by the weight of the cement composition.

12. The method of claim 1 wherein the cement composition has a density in the range of from about 6 pounds per gallon to about 23 pounds per gallon.

13. The method of claim 1 wherein the subterranean formation comprises a production well or a carbon dioxide injection well.

14. The method of claim 1 wherein the cement composition further comprises carbon fibers.

15. The method of claim 14 wherein the carbon fibers have a mean length of about 150 microns.

16. The method of claim 14 wherein the carbon fibers are present in the cement composition in an amount in the range of from about 1% to about 15% by weight of the cement.

17. The method of claim 1 wherein the cement composition further comprises rubber particles.

18. The method of claim 17 wherein the rubber particles are present in the cement composition in an amount in the range of from about 10% to about 30% by weight of the cement.

19. The method of claim 17 wherein the rubber particles have a mean length of less than about ¼".

20. The method of claim 1 wherein the cement composition further comprises fly ash.

21. The method of claim 20 wherein the fly ash comprises ASTM class F fly ash.

22. The method of claim 1 wherein the cement composition is a low-density cement composition.

23. The method of claim 1 wherein the high alumina cement has an alumina concentration in the range of from about 40% to about 80% of the weight of the cement; wherein the high alumina cement is present in the cement composition in an amount in the range of from about 20% to about 80% by weight of the cement composition; wherein the vitrified shale is present in the cement composition in an amount in the range of from about 20% to about 80% by weight of the cement composition; wherein the soluble phosphate is sodium hexametaphosphate present in the cement composition in an amount in the range of from about 1% to about 5% by weight of the cement composition; and wherein the water is present in the cement composition in an amount in the range of from about 30% to about 50% by weight of the cement composition.

24. The method of claim 1 wherein the high alumina cement has an alumina concentration in the range of from about 40% of the weight of the cement to about 80% of the weight of the cement; wherein the high alumina cement is present in the cement composition in an amount in the range of from about 20% to about 80% by weight of the cement composition; wherein the vitrified shale is present in the cement composition in an amount in the range of from about 20% to about 80% by weight of the cement composition; wherein the soluble phosphate is sodium hexametaphosphate present in the cement composition in an amount in the range of from about 1% to about 5% by weight of the cement composition; wherein the water is present in the cement composition in an amount in the range of from about 30% to about 50% by weight of the cement composition; and wherein the cement composition further comprises carbon fibers having a mean length of about 150 microns present in the cement composition in an amount in the range of from about 1% to about 15% by weight of the cement.

25. The method of claim 1 wherein the high alumina cement has an alumina concentration in the range of from about 40% of the weight of the cement to about 80% of the weight of the cement; wherein the high alumina cement is present in the cement composition in an amount in the range of from about 20% to about 80% by weight of the cement composition; wherein the vitrified shale is present in the cement composition in an amount in the range of from about 20% to about 80% by weight of the cement composition; wherein the soluble phosphate is sodium hexametaphosphate present in the cement composition in an amount in the range of from about 1% to about 5% by weight of the cement composition; wherein the water is present in the cement composition in an amount in the range of from about 30% to about 50% by weight of the cement composition; and wherein the cement composition further comprises rubber particles present in the cement composition in an amount in the range of from about 10% to about 30% by weight of the cement.

26. The method of claim 1 wherein the high alumina cement has an alumina concentration in the range of from about 40% of the weight of the cement to about 80% of the weight of the cement; wherein the high alumina cement is present in the cement composition in an amount in the range of from about 20% to about 80% by weight of the cement composition; wherein the vitrified shale is present in the cement composition in an amount in the range of from about 20% to about 80% by weight of the cement composition; wherein the soluble phosphate is sodium hexametaphosphate present in the cement composition in an amount in the range of from about 1% to about 5% by weight of the cement composition; wherein the water is present in the cement composition in an amount in the range of from about 30% to about 50% by weight of the cement composition; and wherein the cement composition is a low-density cement composition.

* * * * *